United States Patent [19]

Lippert

[11] Patent Number: 5,331,786

[45] Date of Patent: Jul. 26, 1994

[54] KNOCKDOWN EARTHQUAKE BRACE FOR RESIDENTIAL GARAGE FRONT WALL

[76] Inventor: Stephen L. Lippert, 985 Summerfield Dr., San Jose, Calif. 95121

[21] Appl. No.: 869,828

[22] Filed: Apr. 15, 1992

Related U.S. Application Data

[63] Continuation-in-part of Ser. No. 856,527, Mar. 24, 1992, abandoned.

[51] Int. Cl.[5] ............................................. E04C 3/30
[52] U.S. Cl. .................................... 52/731.1; 52/721; 49/504; 403/205
[58] Field of Search ................ 52/721, 731.1, 213, 52/656.1, 656.9, 210; 403/205, 401, 403; 49/501, 197, 199, 200

[56] References Cited

U.S. PATENT DOCUMENTS 4,428,135  1/1984  Sobel ............................ 403/401 X
4,513,554  4/1985  Johnson et al. ................. 403/205 X
4,688,358  8/1987  Madray ............................... 52/721
4,812,075  3/1989  Lavin, Sr. .......................... 403/403

FOREIGN PATENT DOCUMENTS 2523664  9/1983  France .............................. 403/205
 630704  6/1982  Switzerland ..................... 403/205

Primary Examiner—Carl D. Friedman
Assistant Examiner—Creighton Smith
Attorney, Agent, or Firm—James J. Leary

[57] ABSTRACT

A lightweight steel/wood earthquake brace for existing or new residential garage front wall. In the preferred embodiment, folded sheet metal legs are bolted together to form a rigid L-bracket. Symmetrical L-brackets are bolted to the garage door wood header and to the concrete footing to stiffen the wall against wind or earthquake. In another embodiment the steel members are connected with protruding tabs and holes.

21 Claims, 8 Drawing Sheets

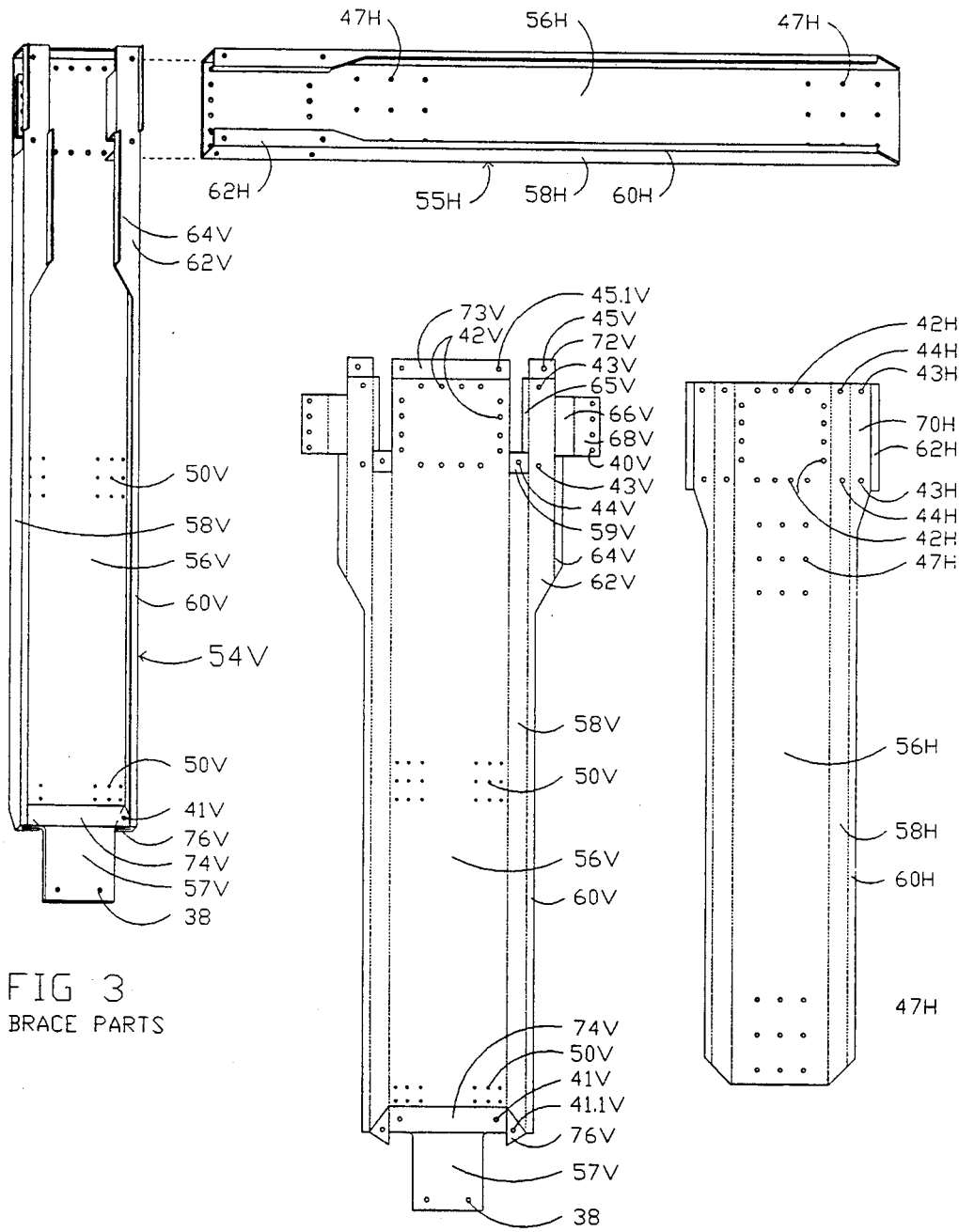
FIG 3 BRACE PARTS
FIG 4 FOLD PATTERN

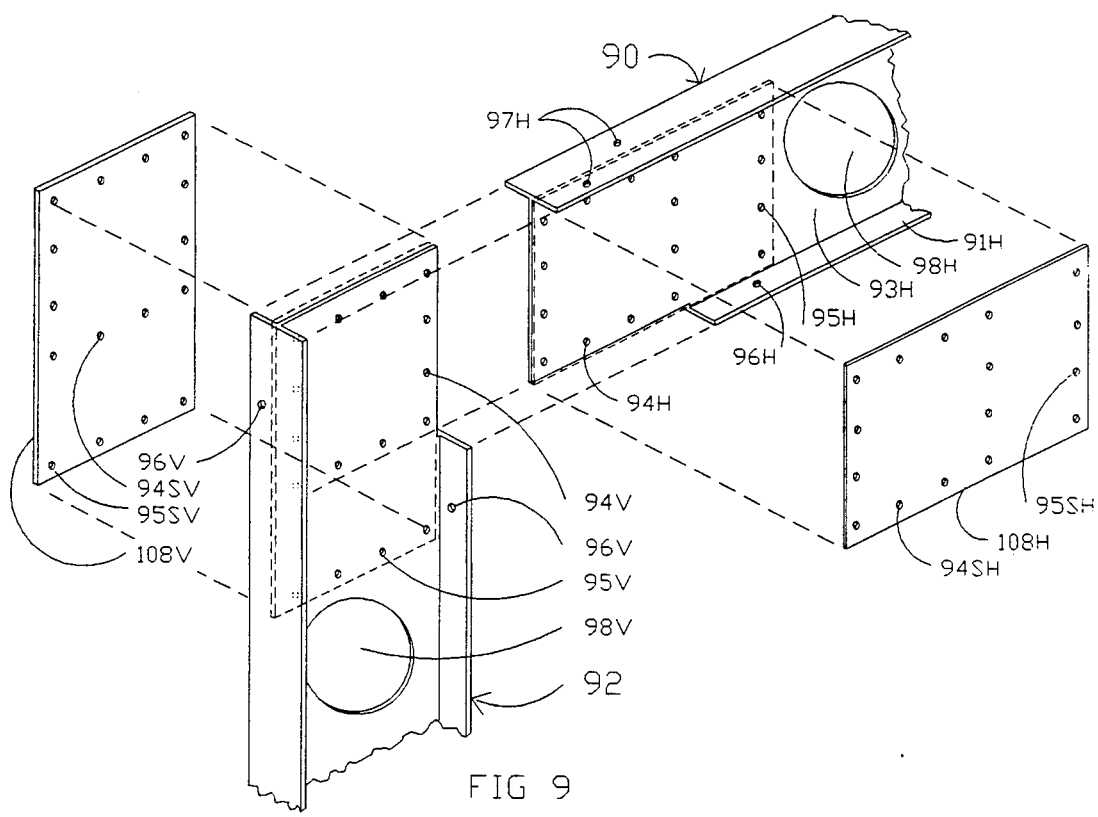
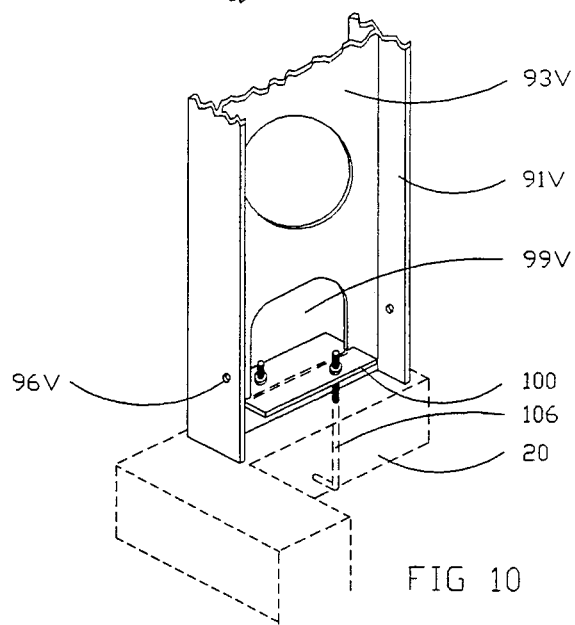
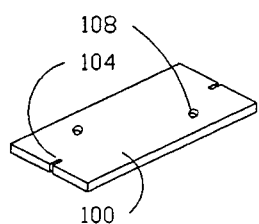
FIG 9
FIG 10
FIG 11

KNOCKDOWN EARTHQUAKE BRACE FOR RESIDENTIAL GARAGE FRONT WALL

This application is a continuation-in-part of application Ser. No. 07/856527 now abandoned.

BACKGROUND-FIELD OF INVENTION

This invention relates to moment earthquake braces, specifically applied to the standard design of a typical residential garage front wall.

BACKGROUND-DESCRIPTION OF PRIOR ART

The typical residential garage front wall usually has short walls (16"-30" wide ) on each side of the garage door opening. Thus, there is little solid wall to resist earthquake forces. The particular weakness of the typical residential garage front wall was dramatically demonstrated in the 1971 San Fernando Earthquake. Single story garages collapsed and second story bedrooms were left perched on top of cars. In order to learn from the design mistakes of typical residential construction the Federal Government (HUD) commissioned the respected non-profit Applied Technology Council to make recommendations for improved construction details. In their report (ATC-4, 1976 available at headquarter office, Foster City, Ca.) a short garage-front plywood shear wall detail was developed. This detail has since become the standard of the construction industry. However, the weakness of this short plywood wall was acknowledged by the Council's report. "Rigid frames constructed of wood are normally considered questionable engineering practice. Detail ... has been developed as a compromise between more expensive solutions and the current inadequate performance at the front of garages " (p. IV-16)

"More expensive solutions" would mean either making the front garage wall longer or of creating a full-blown steel moment frame around the entire door opening. Such steel frames have been custom created on very rare occasions for expensive homes. The steel members are extremely heavy and difficult to move. Because of the size of such frames (8' high×17' long), they have to delivered to the site by long bed trucks and welded at the site. Such work is performed by highly paid specialized personnel and require special inspection and certification. The average homeowner could not do the job. Thus, the need exists for a brace which the average homeowner can buy and install.

OBJECTS AND ADVANTAGES

Several objects and advantages of the present invention are:

(a) Provide a light weight brace or large L-bracket which when connected to the garage door opening header, uses the header's stiffness and strength to help form a steel and wood combination moment frame. Therefore, the L-bracket portion of the frame requires less steel.

(b) Provide a demountable L-bracket brace with no part longer than 8' so that the parts can be compactly displayed in a store and transported in a pickup truck.

(c) Provide a brace which does not require welding at the job site so that a layman can assemble the parts.

(d) Provide a left hand and right hand L-bracket brace in which only two structural shapes (not including bolts) are required to create all members of the brace.

(e) Provide a knockdown moment frame for new construction around the entire garage door opening. Further objects and advantages will become apparent from a consideration of the ensuing description and drawings.

DRAWING FIGURES

FIG. 3 is enlarged view of the preferred version's parts.

FIG. 4 is the fold pattern for the preferred version's parts.

FIG. 9 is an enlarged view of alternate (C) at intersection

FIG. 10 is an enlarged view of alternate (C) at base.

FIG. 11 is an enlarged view of anchor bracket.

REFERENCE NUMERALS IN DRAWINGS

Figure 1:
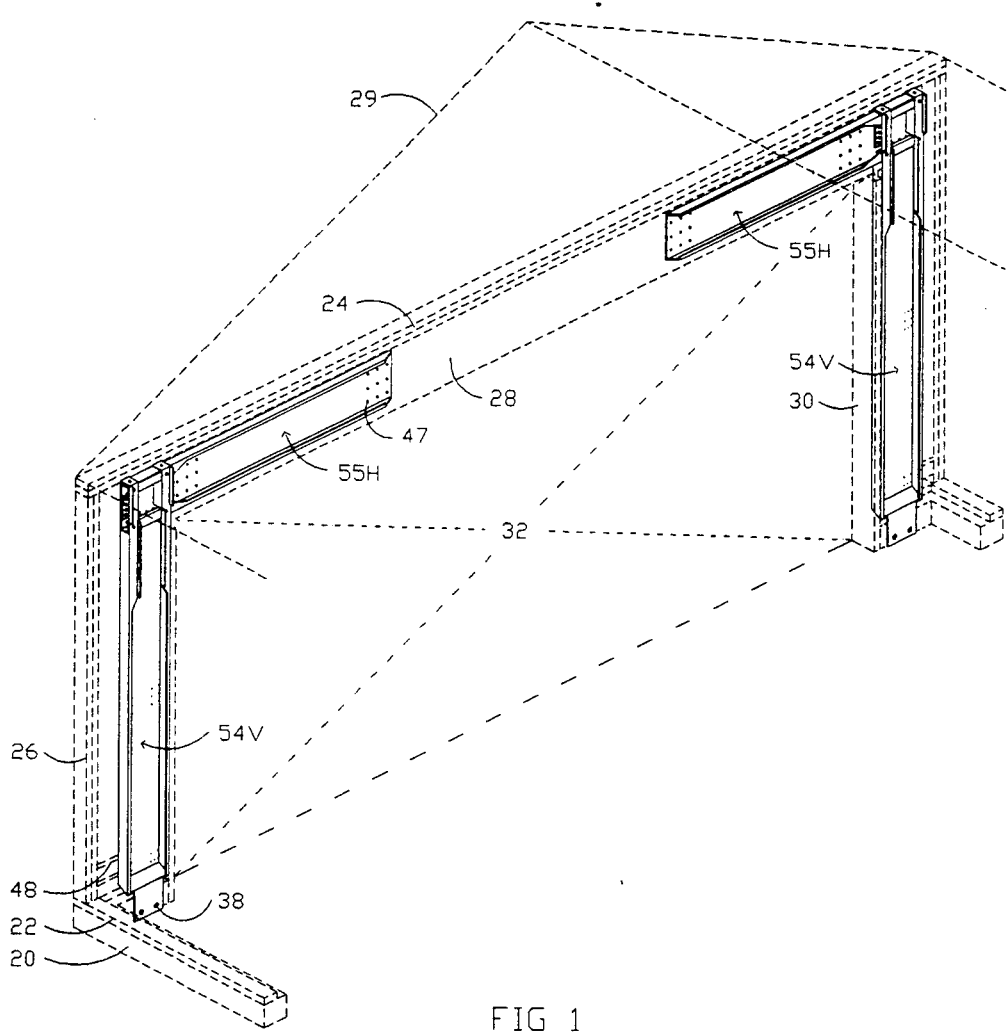
FIG. 1 is a interior isometric view of the garage front wall showing the preferred version of the invention.
Figure 2:
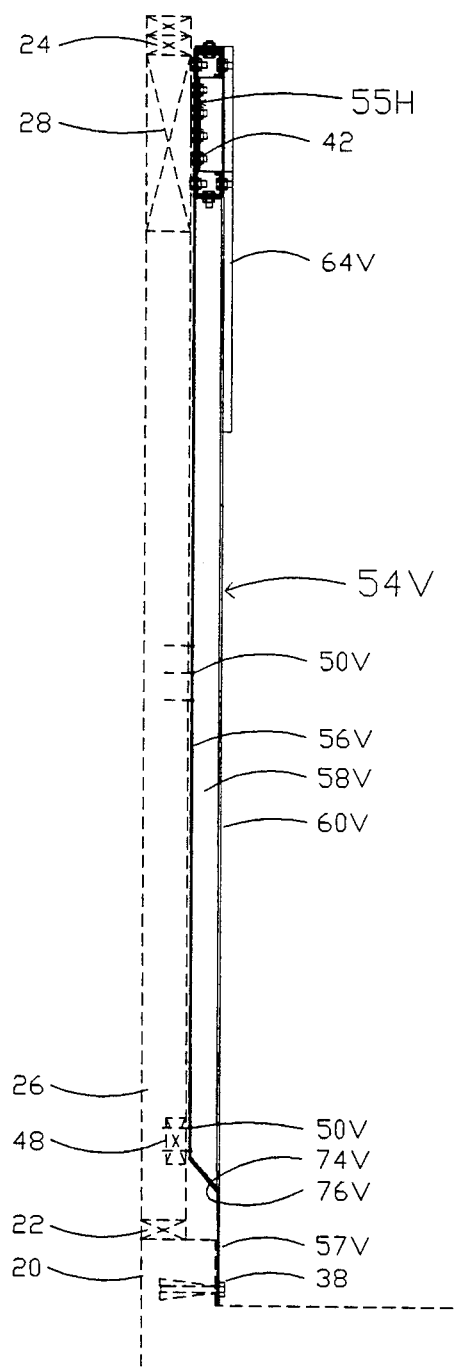
FIG. 2 is a section of the preferred version.
Figure 5:
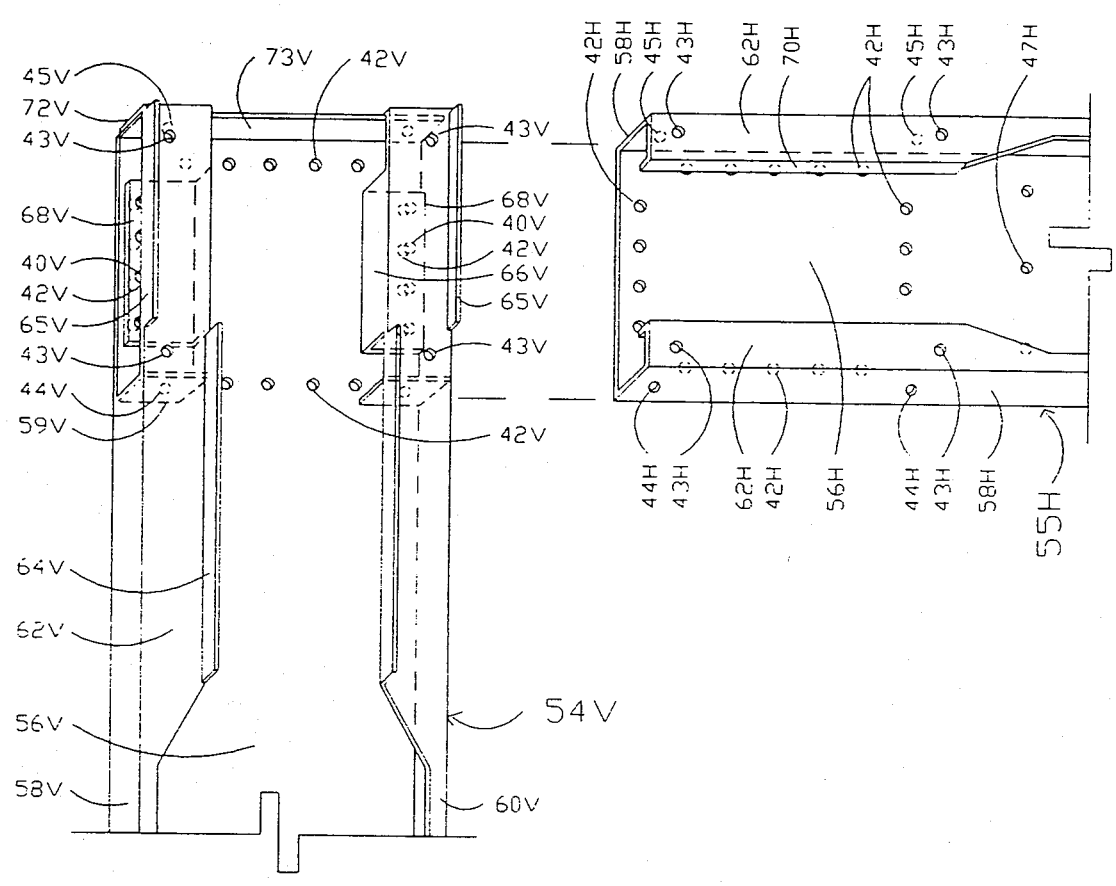
FIG. 5 is a detail at the parts intersection of the preferred version.

Notation: A=Alternate, V=Vertical or column, H=Horizontal or beam

20—Garage perimeter concrete footing
22—2x wood sill plate
24—2x wood top plate
26—2x wood stud
28—4x wood header
29—Garage roof outline
30—Wood trim and garage door track support
32—Garage door opening
34—Structural steel 10" channel, approximately 8" long
36—Structural steel 10" channel, approximately 6" long
38—Hole for expansion or anchor bolt .........
40—Hole for machine bolt in fold member 68V
41—Hole for machine bolt in web 74V
41.1—Hole for machine bolt in tab 76V
—Hole for machine bolt in web 56V
—Hole for machine bolt in flange 62V or 62H
—Hole for machine bolt in tab 59V and 58H
—Hole for machine bolt in tab 72V, 73V, 58H
—3x blocking
—Hole for lag bolt to be screwed into header 28
—2x wood blocking
—Holes for nails
—Combination hole and punched out tab
—Hole for tab insert
—Tab
53.1—Punched out tab
53.2—Punched out tab and hole
53.3—Punched out tab and hole
53.4—Punched out tab and hole
—Vertical light gage folded steel member - approximately 8" high
55—Horizontal light gage folded steel member approximately 6" long
56—Web
57—Narrowed base web
58—Flange
59—Flange
60—Flange return
62—Flange return 64—Fold
65—Fold
66—Fold
68—Fold
70—Fold
72—Fold
73—Flange at head
74—Bent web
76—Bent flap under web 74
78—Flange return
80—Movable arm
82—Push-down tab
84—Moveable locking arm
86—Embossed surface
88—Flange
"90—Wide flange beam
91—WF flange
92—Wide flange column
93—WF Web
94—Bolt holes
94S—Bolt holes in stiffener plate 108
95—Bolt holes
95S—Bolt holes in stiffener plate 108
96—Bolt holes for wood connection
98—Web holes
99—Web hole at column base
100—Hold-down bracket
102—Bolt hole in hold-down bracket
104—Notch
106—Threaded anchor bolt"
108—Stiffener plate

DESCRIPTION OF PREFERRED VERSION—FIGS. 1-5

FIG. 1-5 show isometric views of the preferred version of the garage front wall earthquake brace. The column 54V is bolted to the beam 55H to form a rigid L-bracket brace. Since both column 54V and beam 55H members are symmetrical, each member can be used to form a left or right L-bracket. Both members are typically constructed of folded 13 ga. steel sheet metal.

The base of column 54V is typically connected to the garage concrete footing 20 with ½" expansion or anchor bolts through holes 38 in the narrowed base web 57V. The narrowed base web 57V is bent at about 45 degrees to form bent web 74V. In turn web 74V is bent back again 45 degrees to web 56V. The purpose of bending the webs 57V, 74V and 56V is so that web 56V can be in direct contact with studs 26. Also, beam 55H will therefore be in direct contact with header 28.

Web 56V is folded to form flange 58V. Flange 58V is folded to form flange return 60V. Under angled web 74V, flange 58V is folded to form flap 76V. Flap 76V is typically connected to angled web 74V with a ½" machine bolt in holes 41V and 41.1V. Nail holes 50V are provided at the base and at the mid-point of web 56V. The purpose of the nails at these locations is to stabilize the column in case of buckling. At approximately ¾ length of member 54V, flange return 60V widens to become flange 62V. Flange 62V is folded to form returns 64V and 65V. Flange 58V is folded to form tab 59V. Tap 59V is typically connected to the beam flange 58H with ½" machine bolts through holes 44V and 44H. Column web 56V and stiffener flange 68V is bolted to beam web 56H thru holes 40V, 42V and 42H. Column flange 73V and tab 72V and bolted to beam flange 58H through holes 45V, 45.1V and 45H. Column flange 62V is bolted to beam flange 62H through holes 43V and 43H.

Beam construction is similar. Beam web 56H is folded to become flange 58H. Flange 58H is folded to become flange return 60H. Flange 60H widens to become flange 62H. Flange 62H is folded towards the web to become flange 70H. Beam 55H is lag bolted through holes 47H to the garage door opening header 28. Lag bolt holes are grouped at each end of beam 55H in order to maximize earthquake load transference from L-bracket brace to wood header. More bolt holes are provided than is structurally required in order to have the flexibility to avoid knot holes in the wood header 28.

DESCRIPTION—FIG. 6

Figure 6:
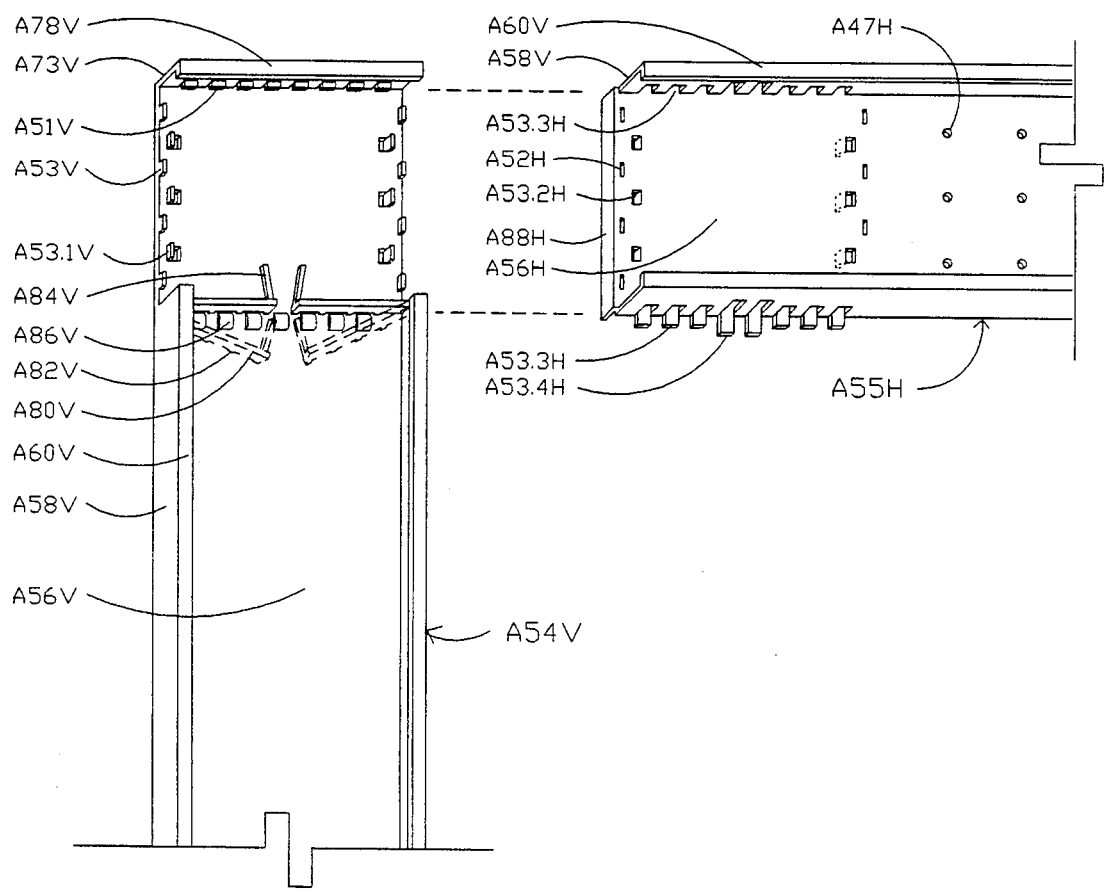
FIG. 6 is an enlarged view of the intersection of alternate (A) of the invention.

Similar to the design of the preferred invention, FIG. 6 shows an alternate (A) boltless connection method between the column A54V and beam A55H. These members would be typically constructed of 11 gage steel sheet metal. Unless otherwise noted, the design of this alternate would be the same as the preferred version.

Towards the top of column A54V, the web A56V is embossed with a series of impressions A86V. These impressions A86V fit between the tabs A53.3H of the beam member. At the edge of the column web are tabs A53V which fit through the beam holes A52H. Adjacent to these intersections are combination tab and hole A53.1V in the column's web which connect with the hole and tab A53.2H of the beam's web. In the top flange A73V of the column are combination hole and tab A51V which connect with combination hole and tab A53.3H in the beam's flange.

All these connections are held in place by the moveable locking arm A80V. This arm rotated so that the locking arm A84V is able to protrude through the hole A53.4H. Once A84V is through it is bent so as to lock the unit in place. Tabs A82V on arm A80V force the tabs A53.3H and A53.4H down so that A53.3H and A53.4H are always in contact with impressions A86V.

FIG. 7

Figure 7:
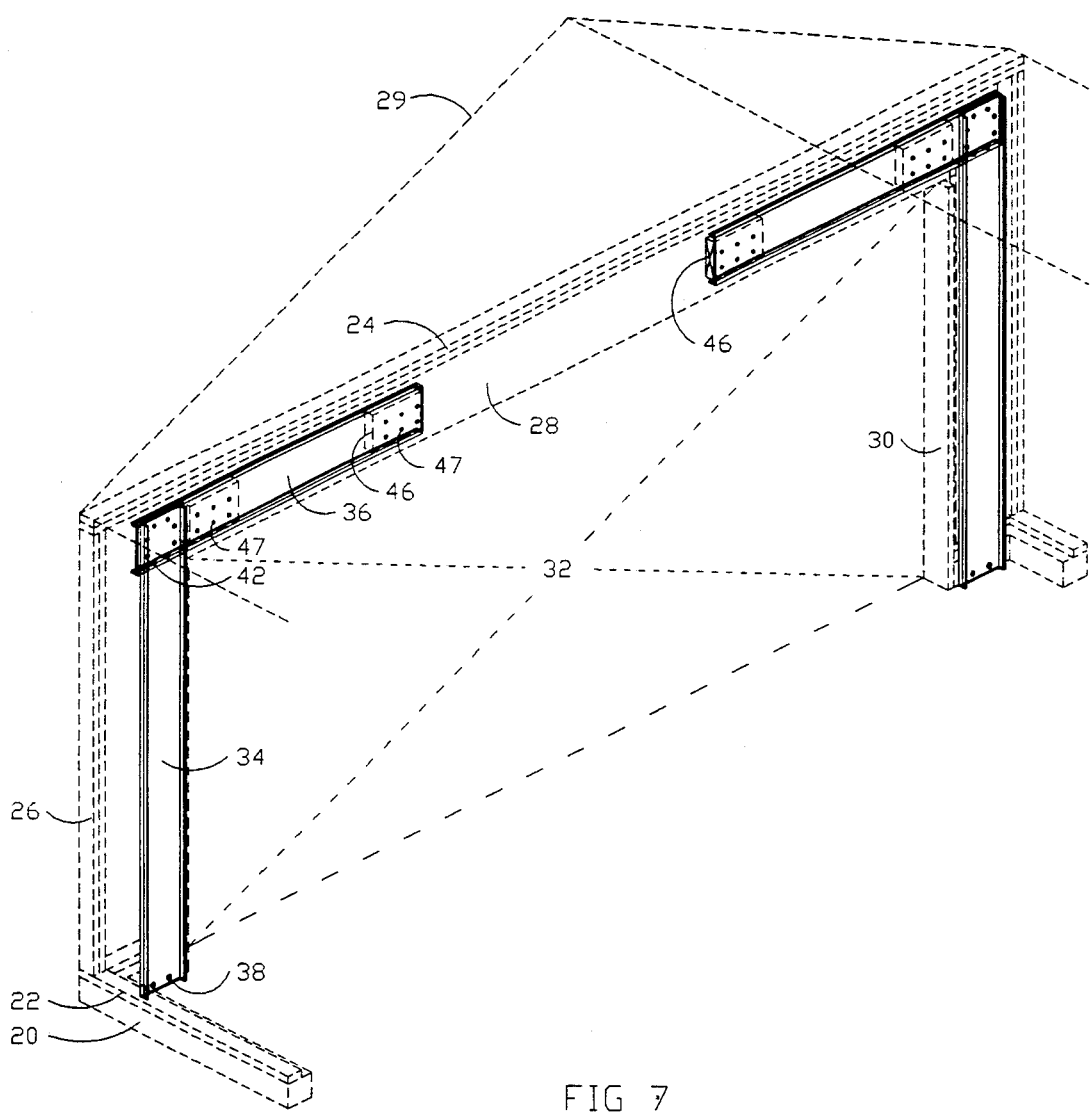
FIG. 7 is a isometric view of alternate (B) of the invention.
Figure 8:
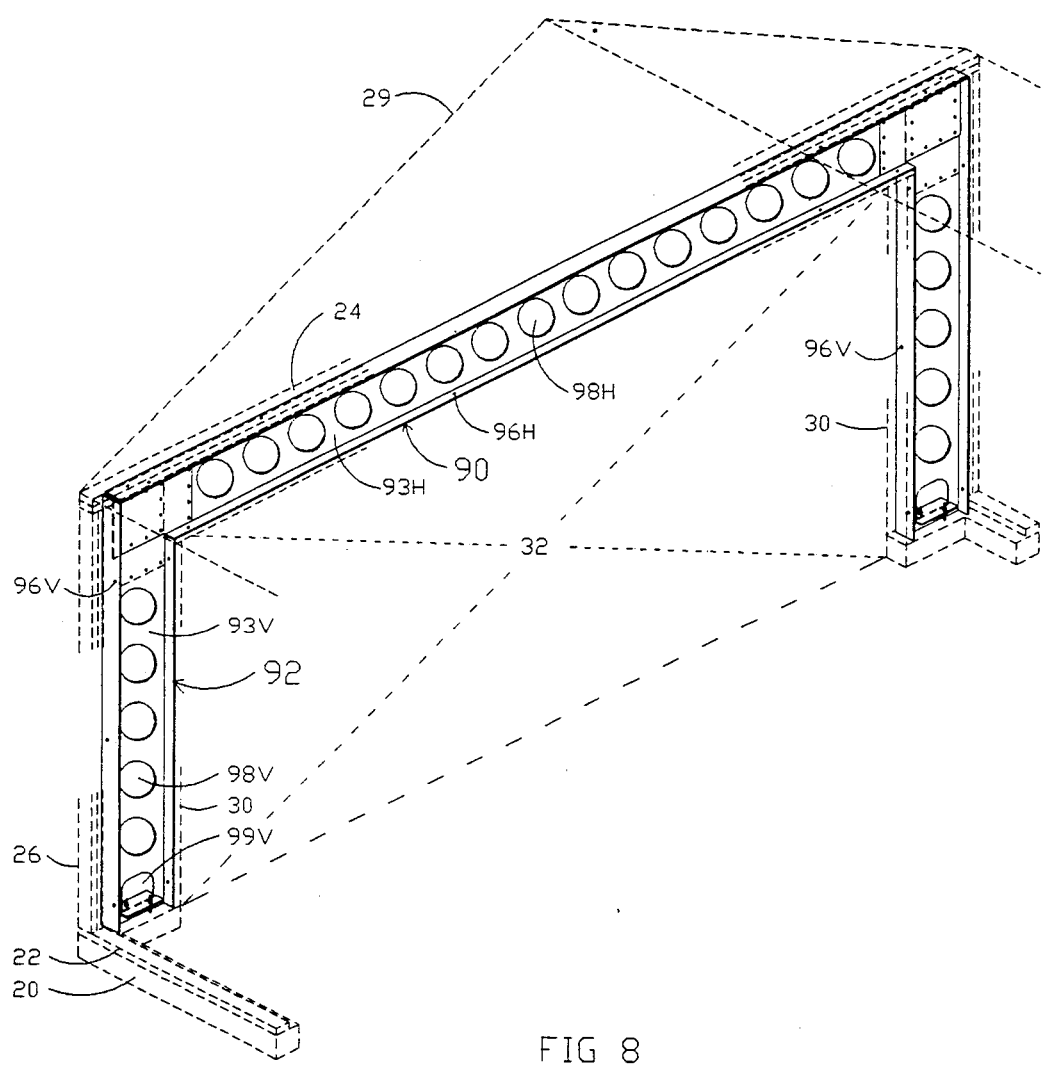
FIG. 8 is a isometric view of alternate (C)

FIG. 7 shows alternate (B). In this case structural steel channel MC10×6.5 or 8.2 is typically used as the column and beam members of the L-bracket brace. Like the previous versions, it is also symmetrical. Each member can be used to form a left hand or right hand brace.

The base of the vertical member 34 is typically connected to the garage concrete footing 20 with ½" expansion or anchor bolts through holes 38. The top of column 34 is typically connected to the end of beam 36 with ¾" machine bolts through holes 42V and 42H. Beam 36 is lag bolted to the garage door opening header 28 through holes 47 and thru wood blocking 46.

DESCRIPTION—FIG. 8-11

FIGS. 8-11 show views of a knockdown bolted steel moment frame for new construction around the entire garage door opening. The column 92 is bolted to the beam header 90 to form a ridge brace and deadload support for the garage front wall. Both members are typically 14–16 inch deep wide-flange steel beam shape. Optional holes 98V and 98H are cut into the webs 93V and 93H of both members in order to reduce weight.

The base of column 92 is connected to the garage concrete footing 20. The connection is typically made by ½" anchor bolts 106 embedded in the concrete footing 20 which protrude through holes 102 in bracket 100.

Notches 104 in bracket 100 intersect with column web 93V at web hole 99V. Thus, column web 93V, bracket 100, and anchor bolts 106 form a rigid assembly.

Flanges 91V and 91H at the end of column 92 and at the end of beam 90 are cut off in order to allow for the intersection of column and beam webs 93V and 93H. It is optional that steel stiffener plates 108V and 108H be used to reinforce the intersection. Once aligned, the column web 93V is typically bolted to the beam web 93H along with stiffener plates 108V and 108H by machine bolts through holes 94V, 94H and 94SV, 94SH. Stiffener plates 108V and 108H are also bolted to Webs 93V and 93H with machine bolts through holes 95V, 95SV and 94H, 94SH.

Holes 96V and 96H are provided in the flanges 91V and 91H for attachment by bolts or screws to wood framing 24, 26, 30.

Holes 97H are provided in the top of flange 91H as a template for positioning anchor bolts 106 during the pouring of the concrete footing 20.

CONCLUSION, RAMIFICATIONS, AND SCOPE OF INVENTION

Since 1971 structural engineers have been acutely aware of the weakness of the typical residential garage front wall. They have longed for a economical, lightweight, easily transportable, and installable (by non-skilled labor) earthquake brace.

By creating a steel and wood combination moment brace, the amount of steel and construction effort that would be required for an all steel brace has been significantly reduced. By allowing the parts to be demounted and assembled at the site without special tools or knowledge allows the homeowner to do the work.

The preferred embodiment show extra folded sheet steel where optimal for added strength and less material where it is not as necessary. The custom folded shape also allows for the direct contact of steel to concrete footing, wood stud framing and header without the use of blocking.

Alternate A shows that the brace members may be connected by means other than bolts. They can be connected by the use of intersecting punched out tabs and holes in the sheet steel.

Alternate B shows that standard steel channels can be used to form a brace.

Alternate C shows a steel beam replacement to the standard wood header above the garage door opening for new residential construction. The beam rigidly coupled with wide columns creates a moment resistive frame: not just a load bearing post and beam. The use of machine bolts to connect the assembly allows the use of unskilled labor to construct the frame.

Aternate C can also be constructed with a plywood truss joist beam and column as manufactured by "Truss Joist Corporation". The stiffener plates 108 would be more elongated and have flanges which would bear against the column and beam flanges 91.

Although the description above contains may specificities, these should not be construed as limiting the scope of the invention but as merely providing illustrations of some of the presently preferred embodiments of this invention. For example:

(a) fold patterns may take more or less elaborate shapes (b) tabs and holes may take various shapes and patterns (c) a steel member(s) may connect each horizontal leg of each L-bracket to add stiffness of the system (d) metal alloys in addition to steel may be used to form sheet metal (e) column's web may not have to be offset with 74V to avoid concrete footing where the wall is constructed with a 6" wood studs and 6" concrete footing (f) beam's length may be varied Thus the scope of the invention should be determined by the appended claims and their legal equivalents, rather than by the examples given.

I claim:

1. In combination:
   a garage front wall having a garage door opening there through, said garage door opening having a height and a width, and said garage door opening having a left side, a right side, a top edge and a bottom edge,
   and a reinforcing brace comprising:
      a left hand L bracket, comprising:
         a first rigid column member positioned adjacent said left side of said garage door opening, said first rigid column member extending substantially the height of said garage door opening,
         a first rigid beam member positioned adjacent said top edge of said garage door opening,
         a first removable, rigid, moment transmitting joint means for fastening said first rigid column member to said first rigid beam member,
         and means for fastening said left hand L bracket to said garage front wall,
      and a right hand L bracket, comprising:
         a second rigid column member positioned adjacent said right side of said garage door opening, said second rigid column member extending substantially the height of said garage door opening,
         a second rigid beam member positioned adjacent said top edge of said garage door opening,
         a second removable, rigid, moment transmitting joint means for fastening said second rigid column member to said second rigid beam member,
         and a means for fastening said right hand L bracket to said garage front wall.

2. The combination of claim 1 wherein said first rigid beam member extends less than half of the width of said garage door opening and wherein said second rigid beam member extends less than half of the width of said garage door opening.

3. The combination of claim 1 wherein said first and second joint means comprises a plurality of bolts fastening said first and second rigid column members to said first and second rigid beam members, respectively.

4. The combination of claim 1 wherein said first and second rigid column members and said first and second rigid beam members are made from metal channel having a web joined to two flanges.

5. The combination of claim 4 wherein said metal channel is made of sheet metal folded to form said web and said two flanges.

6. The combination of claim 1 wherein said first and second joint means comprises a plurality of tabs formed on said first and second rigid column members and a plurality of corresponding holes formed in said first and second rigid beam members said tabs being insertable into said corresponding holes to create a removable, rigid, moment transmitting joint for fastening said first and second rigid column members to said first and second rigid beam members, respectively.

7. The combination of claim 6 further comprising an interlocking means for securing said tabs within said corresponding holes.

8. The combination of claim 1 wherein said first and second joint means comprises a plurality of tabs formed on said first and second rigid beam members and a plurality of corresponding holes formed in said first and second rigid column members said tabs being insertable into said corresponding holes to create a removable, rigid, moment transmitting joint for fastening said first and second rigid column members to said first and second rigid beam members, respectively.

9. The combination of claim 8 further comprising an interlocking means for securing said tabs within said corresponding holes.

10. The combination of claim 4 wherein said garage front wall further comprises a wooden header, said wooden header spanning the top edge of said garage door opening, and wherein said first rigid beam member has means for fastening said first rigid beam member to said wooden header and said second rigid beam member has means for fastening said second rigid beam member to said wooden header, thereby joining said first rigid beam member to said second rigid beam member by way of said wooden header to form a composite wood and metal moment frame to support said garage front wall.

11. The combination of claim 10 wherein said garage front wall further comprises a concrete footing, and wherein said first and second rigid column members have means for fastening said first and second rigid column members to said concrete footing.

12. In combination:
a garage front wall having a garage door opening there through, said garage door opening having a height and a width, and said garage door opening having a left side, a right side, a top edge and a bottom edge,
and a reinforcing brace comprising:
a first rigid column member positioned adjacent said left side of said garage door opening, said first rigid column member having an upper end and a lower end, said first rigid column member extending substantially the height of said garage door opening,
a second rigid column member positioned adjacent said right side of said garage door opening, said second rigid column member having an upper end and a lower end, said second rigid column member extending substantially the height of said garage door opening,
a rigid beam member positioned adjacent said top edge of said garage door opening, said rigid beam member extending substantially the width of said garage door opening, said rigid beam member having a left end and a right end,
a first removable, rigid, moment transmitting joint means for fastening said upper end of said first rigid column member to said left end of said rigid beam member,
a second removable, rigid, moment transmitting joint means for fastening said upper end of said second rigid column member to said right end of said rigid beam member,
and a means for fastening said reinforcing brace to said garage front wall.

13. The combination of claim 12 wherein said first and second joint means comprises a plurality of bolts fastening said first and second rigid column members to said first and second rigid beam members, respectively.

14. The combination of claim 12 wherein said first and second rigid column members and said rigid beam members are made from metal channel having a web joined to two flanges.

15. The combination of claim 14 wherein said metal channel is made of sheet metal folded to form said web and said two flanges.

16. The combination of claim 12 wherein said first and second joint means comprises a plurality of tabs formed on said first and second rigid column members and a plurality of corresponding holes formed in said first and second rigid beam members said tabs being insertable into said corresponding holes to create a removable, rigid, moment transmitting joint for fastening said first and second rigid column members to said first and second rigid beam members, respectively.

17. The combination of claim 16 further comprising an interlocking means for securing said tabs within said corresponding holes.

18. The combination of claim 12 wherein said first and second joint means comprises a plurality of tabs formed on said first and second rigid beam members and a plurality of corresponding holes formed in said first and second rigid column members said tabs being insertable into said corresponding holes to create a removable, rigid, moment transmitting joint for fastening said first and second rigid column members to said first and second rigid beam members, respectively.

19. The combination of claim 17 further comprising an interlocking means for securing said tabs within said corresponding holes.

20. The combination of claim 14 wherein said garage front wall further comprises a wooden header, said wooden header spanning the top edge of said garage door opening, and wherein said rigid beam member has means for fastening said rigid beam member to said wooden header, thereby forming a composite wood and metal moment frame to support said garage front wall.

21. The combination of claim 20 wherein said garage front wall further comprises a concrete footing, and wherein said first and second rigid column members have means for fastening said first and second rigid column members to said concrete footing.

* * * * *